(12) United States Patent
Liu et al.

(10) Patent No.: US 9,075,675 B2
(45) Date of Patent: Jul. 7, 2015

(54) RANDOMIZED VALUE GENERATION

(75) Inventors: Nurrachman Chih Yeh Liu, San Diego, CA (US); Scott M Hanson, Austin, TX (US); Nathaniel Pinckney, Ann Arbor, MI (US); David T Blaauw, Ann Arbor, MI (US); Dennis M. Sylvester, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 1020 days.

(21) Appl. No.: 13/067,470

(22) Filed: Jun. 2, 2011

(65) Prior Publication Data
US 2012/0030268 A1 Feb. 2, 2012

Related U.S. Application Data

(60) Provisional application No. 61/351,218, filed on Jun. 3, 2010.

(51) Int. Cl.
G06F 7/58 (2006.01)
H03K 3/84 (2006.01)
H04L 9/00 (2006.01)
H04L 9/08 (2006.01)

(52) U.S. Cl.
CPC ........ *G06F 7/588* (2013.01); *H03K 3/84* (2013.01); *H04L 9/001* (2013.01); *H04L 9/0866* (2013.01)
USPC ............................. 708/250; 708/254; 708/255

(58) Field of Classification Search
None
See application file for complete search history.

(56) References Cited

U.S. PATENT DOCUMENTS 7,026,217 B1* 4/2006 Kamath et al. ............. 438/281
2008/0279373 A1 11/2008 Erhart et al.
2011/0022648 A1* 1/2011 Harris et al. ................ 708/254

FOREIGN PATENT DOCUMENTS

TW 200913627 3/2009

OTHER PUBLICATIONS

J. Holleman et al, "A 3 µW CMOS True Random Number Generator With Adaptive Floating-Gate Offset Cancellation" *IEEE Journal of Solid-State Circuits*, vol. 43, No. 5, May 2008, pp. 1324-1336.
J. Kim et al, "Three-Transistor One-Time Programmable (OTP) ROM Cell Array Using Standard CMOS Gate Oxide Antifuse" *IEEE Electron Device Letters*, vol. 24, No. 9, Sep. 2003, pp. 589-591.
N. Liu et al, "OxID: On-Chip One-Time Random ID Generation using Oxide Breakdown".
P. Candelier et al, "One Time Programmable Drift Antifuse Cell Reliability" 38th Annual International Reliability Physics Symposium, 2000, pp. 169-173.
M. Bucci et al, "A High-Speed Oscillator-Based Truly Random Number Source for Cryptographic Applications on a Smart Card IC" *IEEE Transactions on Computers*, vol. 52, No. 4, Apr. 2003, pp. 403-409.

(Continued)

*Primary Examiner* — Michael D Yaary
(74) *Attorney, Agent, or Firm* — Nixon & Vanderhye P.C.

(57) ABSTRACT

A data processing apparatus is provided for producing a randomized value. A cell in the data processing apparatus comprises a dielectric oxide layer and stress voltage circuitry is configured to apply a stress voltage across the dielectric oxide layer of the cell to cause an oxide breakdown process to occur. Oxide breakdown detection circuitry is configured to determine a current extent of the oxide breakdown process by measuring a response of the dielectric oxide layer to the stress voltage and randomized value determination circuitry is configured to determine a randomized value in dependence on the current extent of the oxide breakdown process.

30 Claims, 11 Drawing Sheets

(56) References Cited

OTHER PUBLICATIONS

J.H. Stathis, "Percolation models for gate oxide breakdown" *Journal of Applied Physics*, vol. 86, No. 10, Nov. 1999, pp. 5757-5766.

N. Liu et al, "A True Random Number Generator using Time-Dependent Dielectric Breakdown".

A. Rukhin et al, "A Statistical Test Suite for Random and Pseudorandom Number Generators for Cryptographic Applications" NIST Special Publication 800-22, Revision 1A, Apr. 2010, pp. i-G-1.

D.J. Kinniment et al, "Design of an On-Chip Random Number Generator using Metastability" ESSCIRC 2002, pp. 595-598.

S. Yasuda et al, "Physical Random Number Generator Based on MOS Structure After Soft Breakdown" *IEEE Journal of Solid-State Circuits*, vol. 39, No. 8, Aug. 2004, pp. 1375-1377.

C.S. Petrie, "A Noise-Based IC Random Number Generator for Applications in Cryptography" *IEEE Transactions on Circuits and Systems*, vol. 47, No. 5, May 2000, pp. 615-621.

H. Ito et al, "Pure CMOS One-time Programmable Memory using Gate-Ox Anti-fuse" IEEE 2004 Custom Integrated Circuits Conference, 2004, pp. 469-472.

C. Tokunaga et al, "True Random Number Generator With a Metastability-Based Quality Control" *IEEE Journal of Solid-State Circuits*, vol. 43, No. 1, Jan. 2008, pp. 78-85.

F. Pareschi et al, "A Fast Chaos-based True Random Number Generator for Cryptographic Applications" IEEE 2006, pp. 130-133.

S. Srinivasan et al, "2.4GHz 7mW All-Digital PVT-Variation Tolerant True Random Number Generator in 45nm CMOS" *2010 Symposium on VLSI Circuits/Technical Digest of Technical Papers*, 2010, pp. 203-204.

H. Cha et al, "A 32-KB Standard CMOS Antifuse One-Time Programmable ROM Embedded in a 16-bit Microcontroller" *IEEE Journal of Solid-State Circuits*, vol. 41, No. 9, Sep. 2006, pp. 2115-2124.

R. Brederlow et al, "A Low-Power True Random Number Generator using Random Telegraph Noise of Single Oxide-Traps" ISSCC 2006/Session 23/Technology and Architecture Directions/23.3, 2006, 10 pages.

Taiwanese Office Action dated Nov. 18, 2014 in TW 100119059, 5 pages.

\* cited by examiner

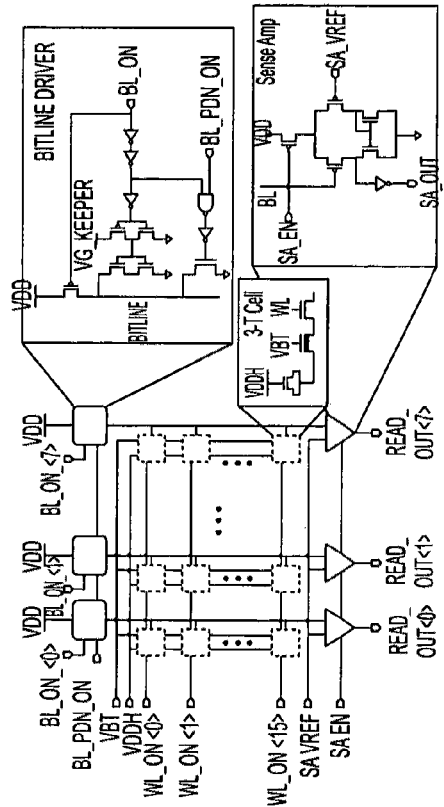
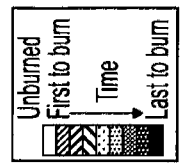
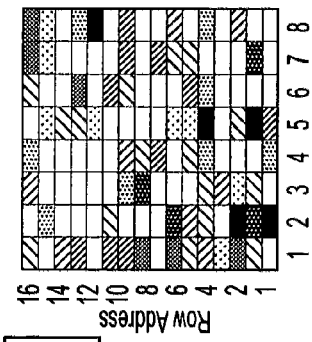
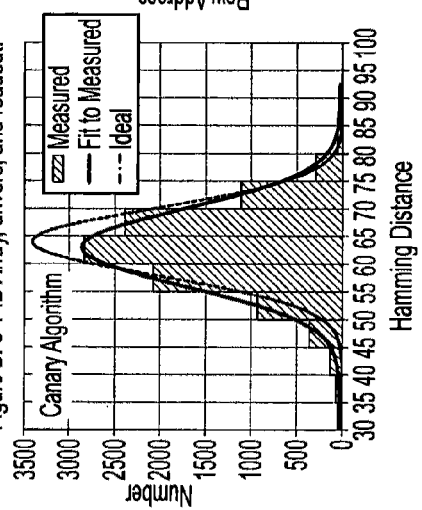
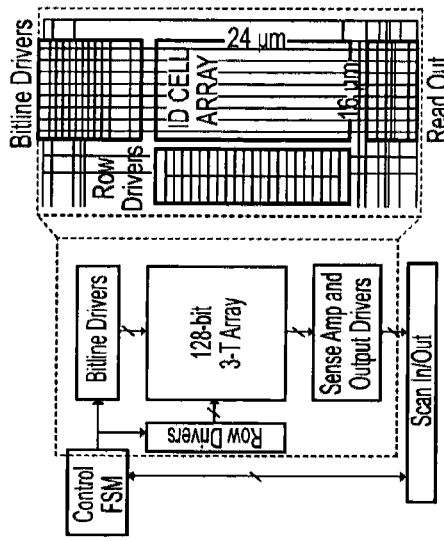
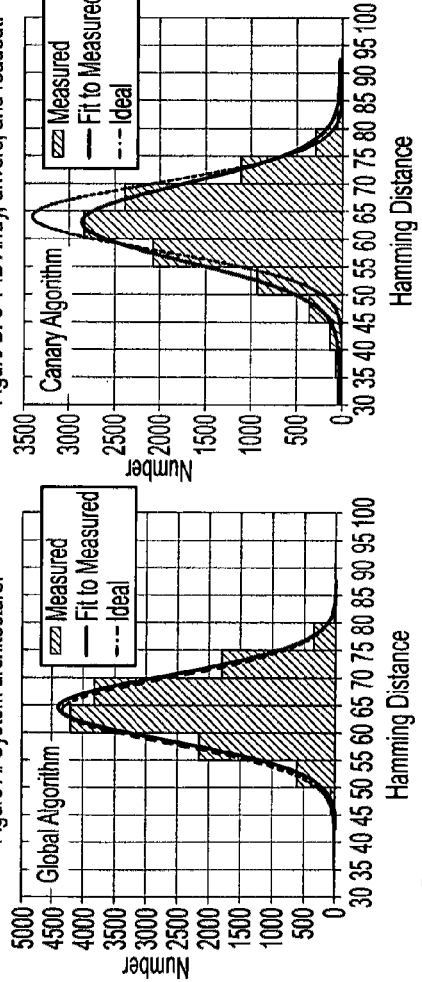
Figure A: System architecture.
Figure B: 3-T ID Array, drivers, and readout.
Figure C: 3-T cell; bitline driver; sense amp.
Figure D: Measured Hamming distance for global algorithm. 162 Arrays total.
Figure E: Measured Hamming distance for canary algorithm. 144 Arrays total.
Figure F: Measured spatial time evolution of a typical array oxide burn times.
FIG. 10 (Part 1)

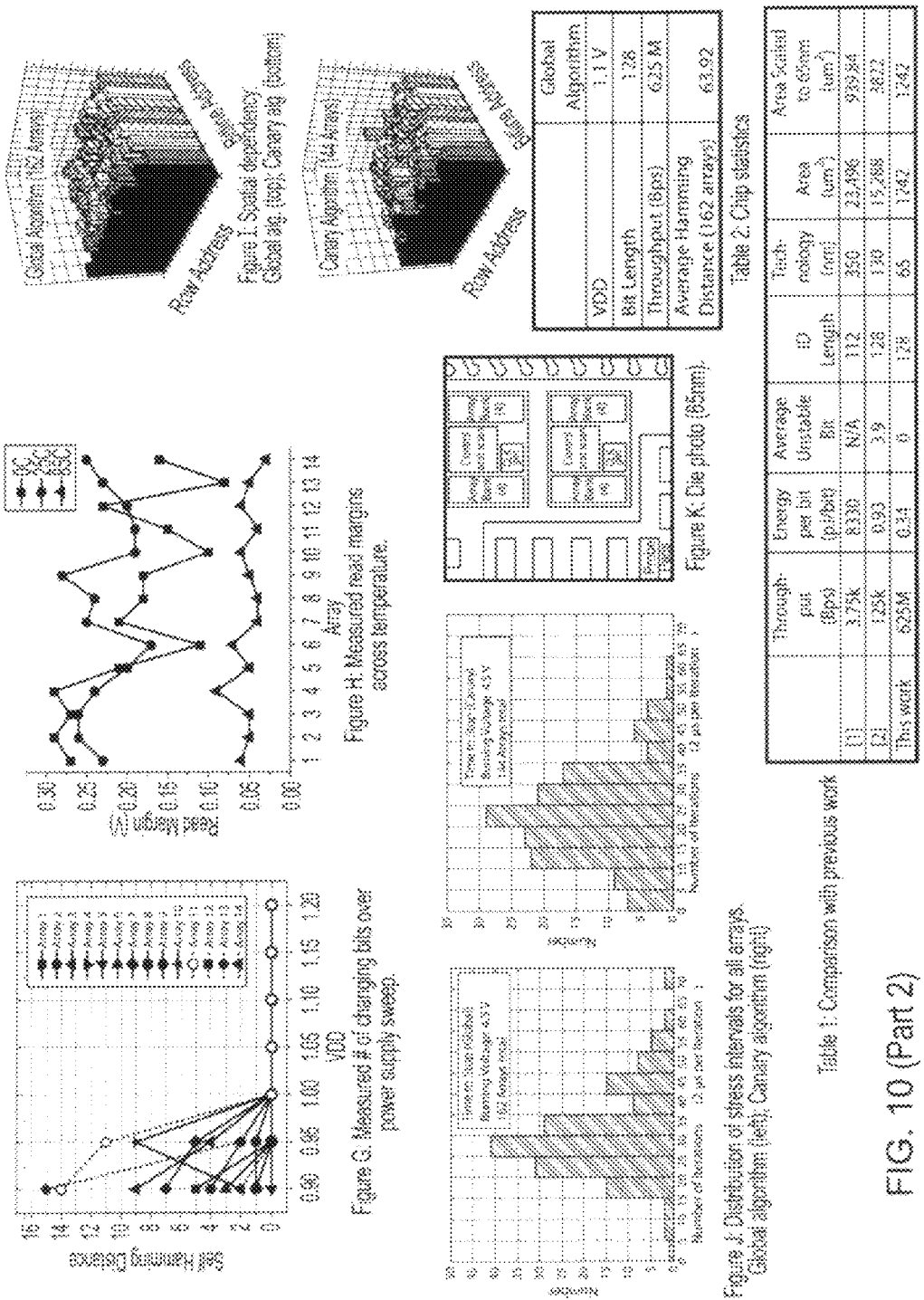
FIG. 10 (Part 2)

RANDOMIZED VALUE GENERATION

This application claims priority to U.S. Provisional Application No. 61/351,218, filed Jun. 3, 2010, the entire content of which is hereby incorporated by reference.

BACKGROUND OF THE INVENTION

1. Field of the Invention

The present invention relates to data processing apparatuses which are configured to generate randomized values.

2. Description of the Prior Art

It is known that random number generation plays a crucial role in cryptography and security. For example, public key cryptography systems demand strong key pair generation to ensure that a third-party cannot decrypt a secret message. Previously, random bit sequences have been generated in digital systems using pseudo-random number generators. However, the sequences produced by these generators are not truly random and contain exploitable patterns, such as repetition and correlation.

Accordingly, true random number generators (tRNGs) use physical phenomena as a random source to produce bits. Previous on-chip tRNG architectures have used telegraph noise (Brederlow, R., et al., "A Low-Power True Random Number Generator using Random Telegraph Noise of Single Oxide-Traps," ISSCC, February 2006) and thermal noise as the physical source. The thermal noise is often used indirectly with a metastable inverter (Holleman, J., et al., "A 3 µW CMOS True Random Generator With Adaptive Floating-Gate Offset Cancelation," JSSC, May 2008; Tokunaga, C., et al., "True Random Number Generator with a Metastability-Based Quality Control," IEEE Journal of Solid-State Circuits, January 2008; Kinniment, D., et al., "Design of an On-Chip Random Number Generator using Metastability," ESSCIRC, September 2002; Srinivasan, S., et al., "2.4 GHz 7 mW All-Digital PVT-Variation Tolerant True Random Number Generator in 45 nm CMOS," VLSIC, June 2010), a jitter-prone oscillator (Bucci, M., et al., "A High-Speed Oscillator-Based Truly Random Number Source for Cryptographic Applications on a Smart Card IC," IEEE Transactions on Computers, April 2003; Petrie, C., et al., "A Noise-Based IC Random Number Generator for Applications In Cryptography," IEEE Transactions on Circuits and Systems, May 2000) or a discrete-time chaotic pipelined structure (Pareschi, F., et al., "A Fast Chaos-Based True Random Number Generator for Cryptographic Applications," ESSCIRC, September 2006). An alternative approach has used fluctuating gate oxide current after soft breakdown (SBD) as a noise source (Yasuda, S. et al., "Physical Random Number Generator Based on MOS Structure After Soft Breakdown", JSSC, August 2004). Aspects of oxide breakdown are discussed, for example, in Stathis, J., Journal of Applied Physics, pp. 5757-5766, Vol. 86, November 1999. Once an oxide breaks down, its resistance changes from an essentially infinite value to the order of $M\Omega$ or $k\Omega$ (see Kim, J. and Lee, K., Electron Device Letters, pp. 589-591, September 2003), a characteristic which has led to its use in one-time programmable arrays (Ito, H. and Namekawa, T., CICC, pp. 469-472, 2004; P. Candelier et al., IRPS, pp. 169-173, 2000; and Cha, H.-K. et al., JSSC, pp. 2115-2124, Vol. 41, No. 9, September 2006).

However, many of these prior architectures have relied on an invasive post-processing step to remove bias in the generated stream, a process which heavily modifies the bitstream and brings into doubt its randomness. For example, a common modifier is a von Neumann corrector to remove long runs of 0's and 1's. In addition, the architectures that do not require a post-processor have only been able to pass five of the fifteen statistical randomness tests in the NIST 800-22 benchmark "National Institute of Standards and Technology, "A Statistical Test Suite for the Validation of Random Number Generators and Pseudo Random Number Generators for Cryptographic Applications," Pub. 800 22 2001), the accepted standard test for true randomness. In addition, many prior art generators require precise, involved statistical calibration in order to ensure randomness. In particular, recalibration is often required when environmental conditions (e.g. ambient temperature) change.

One particular application where randomized (unique) value generation is required is in the provision of unique chip ID values, for example as are used to enforce user licenses as well as in communication and security protocols. In these applications, it is desirable to generate IDs on-chip at the application point so that the IDs are guaranteed to be previously unknown. This avoids the need for off-chip, pre-generated IDs that are programmed using fuses, a process that exposes IDs to human intervention and storage on computers that may be compromised.

It is known that a key requirement for chip ID generation is that the generated ID is unique to only that chip, and that once generated the ID is time and environmentally invariant. Typically, the chances that two chip IDs have all (or at least many) bits the same is minimized by using a large bit width (e.g. 128 bits/ID) and ensuring a high degree of randomness during generation. Previous methods rely on inherent threshold voltage mismatch between devices, which is detected by measuring either device current (K. Lofstrom, et al., ISSCC, pp. 372-373, 2000) or inherent SRAM bit cell skew towards a 0 or 1 state (Y. Su, et al., ISSCC, pp. 406-407, 2007). However threshold voltage mismatch can be very small between any particular transistor pair, making it difficult to repeatedly generate an identical ID for a given chip. As a result, previous approaches exhibit as a result a small number of bit flips between successive ID readings (i.e. the IDs have a non-zero self Hamming distance), complicating the use and the reliability of the chip IDs generated.

It would be desirable to provide an improved technique for generating such randomized values, in the light of the above-mentioned particular drawbacks of the prior art.

SUMMARY OF THE INVENTION

Viewed from a first aspect, the present invention provides a data processing apparatus comprising: a cell comprising a dielectric oxide layer; stress voltage circuitry configured to apply a stress voltage across said dielectric oxide layer of said cell to cause an oxide breakdown process to occur; oxide breakdown detection circuitry configured to determine a current extent of said oxide breakdown process by measuring a response of said dielectric oxide layer to said stress voltage; and randomized value determination circuitry configured to determine a randomized value in dependence on said current extent of said oxide breakdown process.

The inventors of the present invention realised that the inherently random nature of the oxide breakdown of a dielectric oxide layer could be used as the random source in circuitry configured to generate a randomized value. In particular, they realised that, because the "time to dielectric breakdown" (TTB) is different and unpredictable for two identical oxide layers which are subjected to the same stress conditions (i.e. a stress voltage applied across the dielectric oxide layer), this timing could be used as the random source in a data processing apparatus configured to generate randomized values.

Accordingly, the present invention makes use of the randomness inherent in the TTB in order to generate randomized values. To do this, the data processing apparatus comprises at least one cell having a dielectric oxide layer and stress voltage circuitry which is provided to apply a stress voltage across this dielectric oxide layer to cause an oxide breakdown process to occur. The response of the dielectric oxide layer to the stress voltage is measured (for example by measuring a voltage across a resistor coupled between the cell and ground) to determine the current extent of the oxide breakdown process. It should be recognised that the breakdown of the dielectric oxide layer in response to the application of the stress voltage is an essentially uni-directional process. That is to say that when measuring, say, the current flow across the dielectric oxide layer, this current will grow with time (i.e. the longer a stressing voltage is applied). Although there will be a certain amount of jitter in the precise time evolution of the current, the overall trend is uni-directional. Accordingly the nature of the oxide breakdown process in the present context can be considered to be non-transitory, i.e. not merely a temporary fluctuation in the response of the dielectric oxide layer to the stress conditions, but part of a more general overall trend of irreversible ongoing oxide breakdown. Crucially, the rate at which this evolution occurs is unpredictable and, from dielectric oxide layer to dielectric oxide layer, is essentially random. Hence, the oxide breakdown detection circuitry measurs the response of said dielectric oxide layer to said stress voltage and determines the extent of the oxide breakdown process, for example by determining when the current flow across the dielectric layer exceeds a given threshold. The random nature of the evolution of the oxide breakdown provides that the exact time when this event occurs is unpredictable. Randomized value determination circuitry is then further provided to determine a randomized value in dependence on the extent of the oxide breakdown process.

There are various ways in which the apparatus could make use of when the oxide breakdown event occurs (i.e. the TTB) to determine the randomized value. In one embodiment said randomized value determination circuitry is configured to determine said randomized value in dependence on a time period measurement of a time period between application of said stress voltage and determination by said oxide breakdown circuitry of occurrence of an oxide breakdown event, said oxide breakdown event corresponding to a predetermined extent of said oxide breakdown process. Thus a measurement of the TTB itself, due to the inherent unpredictability of the rate of oxide breakdown for a given dielectric oxide layer, can be used by the randomized value determination circuitry to determine the randomized value.

In one embodiment, said randomized value determination circuitry is configured to determine said randomized value in dependence on a transformed version of said time period measurement. The TTB values will generally have a normal distribution with a finite variance, such that the randomized value could also be produced with a normal distribution. Whilst in some applications this might desirable, in other applications it may be preferable to remove this effect and accordingly a transformation of the time period measurement can be made in order to achieve this.

The transformed version of the time period measurement could be produced in a number of ways, but in one embodiment said randomized value determination circuitry is configured to determine said randomized value in dependence on lower order elements of said time period measurement and to discard at least one higher order element of said time period measurement. Discarding at least one higher order element of the time period measurement is an effective way of transforming the time period measurement to unfold the normal distribution, leaving randomized data values with a uniform distribution.

The manner in which the least one higher order element is discarded could take a number of forms, but in one embodiment said randomized value determination circuitry comprises a bit counter configured to generate a bit count value indicative of said time period measurement; and wherein said randomized value determination circuitry is configured to discard a predetermined number of most significant bits of said bit count value and to use remaining lower significance bits as said randomized value. Accordingly, when a bit counter is used to provide the time period measurement, the transformation of the time period measurement to generate a uniform distribution can be achieved by firstly searching for the most significant bit position in the counter and discarding this "1" value along with n−1 successive higher-order bits, where n is a predetermined number chosen by the system designer. The remaining lower order bits used to provide the randomized value. Given that these lower order bits will certainly have rolled over several times, a high quality random bit stream can be produced. Furthermore, this technique adjusts for shifts in the mean TTB (or count value) due to variation in the oxide thickness and wear-out conditions. In addition, this technique has the benefit that it does not involve any post-processing, and therefore no observation or manipulation of the bits that are placed in the bits stream occurs, which could otherwise represent a potential source of influence on the random nature of the results produced.

In one embodiment, said stress voltage circuitry is configured to remove said stress voltage from said dielectric oxide layer when said oxide breakdown event occurs, such that further progress of said oxide breakdown process on said dielectric oxide layer is halted. The inventors of the present invention realized that, because oxide breakdown occurs in stages, a given dielectric oxide layer can in fact be used many times to generate a random sequence of bits, by repeatedly applying a stress voltage until the oxide fully breaks down. Hence, for any given iteration of generating random bits from a dielectric oxide layer, when the oxide breakdown event is detected, the stress voltage can be removed to prevent further oxide breakdown and thus saving this capacity of the dielectric oxide layer for further random bit generation until needed. This technique is also of particular benefit in the context of an array of cells each having a dielectric oxide layer, since the cells can then be used in a turn to generate sequences of random bits and thereby spreading out the wear on the cells across the array.

There are various ways in which the oxide breakdown detection circuitry could measure the response of said dielectric oxide layer to the stress voltage, but in one embodiment said oxide breakdown detection circuitry comprises a comparator configured to compare an oxide layer voltage measured at an output of said cell to a reference voltage. The provision of a comparator arranged in this manner enables the oxide breakdown detection circuitry to measure the response of the dielectric oxide layer to the stress voltage, in particular by virtue of the fact that a reference voltage can be set, with which the oxide layer voltage is compared. This enables an easily configurable mechanism for measuring the response of the oxide layer to the stress voltage.

There is a relationship between the reference voltage and the time period measurement, in that the higher the reference voltage is set, the longer the time period will be. Conversely, lower reference voltages will result in shorter time periods. In view of this, one embodiment is configured such that, if said time period measurement is determined to be below a lower time limit, said oxide breakdown detection circuitry increases said reference voltage. Accordingly, if the time period is too short (i.e. the oxide breakdown event is determined as having happened too quickly), the reference voltage is increased, generating a longer count and therefore resulting in a longer string of random bits.

Conversely, if the reference voltage becomes too high, the oxide layer could be subjected to more stress than is required for the purposes of generating the number of bits required. Indeed the time period could be such that, for a fixed counter length, the whole counter rolls over and no additional bits are being generated with longer application of the stress voltage. Accordingly, one embodiment is configured such that, if said reference voltage reaches a predetermined reference voltage limit, said stress voltage circuitry decreases said stress voltage and said oxide breakdown detection circuitry resets said reference voltage to a minimum reference voltage.

Accordingly, embodiments of the present invention provide techniques for enabling the apparatus to converge on an advantageous balance of stress voltage and reference voltage, allowing the total number of random bits generated by a given cell (or cells) to be maximised.

One embodiment comprises a plurality of cells, each cell of said plurality of cells comprising said dielectric oxide layer, wherein said stress voltage circuitry is configured iteratively to apply said stress voltage across said dielectric oxide layer of each cell of said plurality of cells in turn until said oxide breakdown event occurs in each. Accordingly, the plurality of cells can be used in turn, with one cell stressed at a time. This enables the stressing of the oxide layers over the lifetime of the device to be spread out evenly over the individual cells. Furthermore, it has been found that after stressing, a certain degree of "self-healing" of the oxide layer can occur, for example where the resistance of the oxide layer falls to a certain level under the application of the stress voltage over a given period, if the stress voltage is removed and the oxide layer is allowed some "recovery" time, the resistance of the oxide layer can be found to have risen slightly by the time the stress voltage is reapplied. By stressing the cells in the array in turn this effect can be made use of to extend the life of the device, in that the combined lifetime of the array as the random source is greater if the individual cells are allowed some recovery before the stress voltage is reapplied.

When the cells of a plurality of cells are sequentially stressed in this fashion, in one embodiment said randomized value determination circuitry is configured to concatenate randomized values from said plurality of cells to produce a random bitstream. Thus the apparatus can provide a continuous randomized stream of bits.

In another embodiment the apparatus comprises a plurality of cells, each cell of said plurality of cells comprising said dielectric oxide layer, wherein said stress voltage circuitry is configured to apply said stress voltage across said dielectric oxide layer of each cell of said plurality of cells simultaneously for a stress period; said oxide breakdown circuitry is configured to determine, for each cell, if an oxide breakdown event has occurred, said oxide breakdown event corresponding to a predetermined extent of said oxide breakdown process; and said randomized value represents which of said plurality of cells have experienced said oxide breakdown event during said stress period. This embodiment of the invention has been developed in recognition of the fact that over the course of a (suitably selected) stress period some of the plurality of cells will experience an oxide breakdown event, but the distribution of which particular cells experience such an oxide breakdown event is random. The randomized value in this embodiment shows which cells have experienced an oxide breakdown event. In other words, the length of the randomized value is determined by the number of cells, with individual elements of the randomized value being determined by fate of the corresponding cells.

Whilst this representation of the randomized value could take a number of forms, in one embodiment said randomized value determination circuitry is configured to generate said randomized value as a binary sequence, each bit of said binary sequence being determined by whether said oxide breakdown event has occurred for a corresponding cell of said plurality of cells. For example, within the binary sequence, a "1" could indicate that the corresponding cell has experienced the oxide breakdown event, whilst a "0" could indicate that the corresponding cell is intact.

The breakdown times (TTB) of the dielectric oxide layers of this plurality of cells itself follows a random distribution, but the mean of the distribution may be difficult to determine a priori and can change from apparatus to apparatus due to, for example, oxide thickness variations because of manufacturing variability. In essence this means that a suitable length of stress period, in which an appropriate number of the cells do and don't experience an oxide breakdown event, can be difficult to predict in advance.

Accordingly in one embodiment said stress voltage circuitry is configured to apply said stress voltage in time increments; and said randomized value determination circuitry is configured to determine a set of cells which have experienced said oxide breakdown event after each time increment. This incremental approach to applying the stress voltage to the plurality of cells enables the progression of the oxide breakdown events in the respective cells to be monitored.

This incremental approach can be beneficial because, in effect, the mean of the breakdown times can effectively be monitored on-the-fly. In particular, in one embodiment said stress voltage circuitry is configured to cease said time increments when at least a predetermined proportion of said plurality of cells have experienced said oxide breakdown event. This enables the variations in the mean of the distribution of the breakdown times to be taken into account, such that it is ensured that approximately the right number of cells experience the oxide breakdown event for the purposes of the randomized value generation.

The particular value of this predetermined proportion can be freely set by the system designer, but in one embodiment, said predetermined proportion is half of said plurality of cells. Setting the predetermined proportion as half is advantageous as this maximizes the length of randomized value that can be generated for a given number of cells in the apparatus.

One effect of stopping these time increments when, say, half of the plurality of cells have experienced the oxide breakdown event is that the randomized value which is thereby generated will have a nearly identical number of zeros and ones. It should be recognized that whilst that this does not reduce the randomness of the randomized value, it does reduce the number of possible permutations. For example, for a randomized value having 128 bits, the number of possible permutations reduces by a factor of approximately $2^{3.8}$. In order to counteract this effect a larger number of cells could of course be used. However, in one embodiment said randomized value determination circuitry is configured to determine said set of cells from amongst a reduced set of cells in said plurality of cells. By performing the determination with respect to only a reduced set of cells, because of random variation between the reduced set and the remainder of the cells, a larger number of permutations is generated.

In one embodiment, said stress voltage circuitry is configured to reapply said stress voltage for a predetermined additional period after said stress period to those cells which have experienced said oxide breakdown event. This "afterburn" technique is provided in recognition of the fact that some border line cases of cells which have only just satisfied the criteria for determining that an oxide breakdown event has happened can, once the stress voltage has been removed, slip back across that threshold due to a moderate self-healing which can occur in a stressed dielectric oxide layer after the stress conditions have been removed. Accordingly, reapplying the stress voltage for an additional period to those cells which have been determined to have experience the oxide breakdown event pushes those cells further beyond the relevant threshold, and reduces the likelihood that they will relax back across that threshold afterwards.

Once the plurality of cells have been subjected to the stress voltage, causing an oxide breakdown event in a number of them, the set of cells can later be read, using a lower (i.e. non-stressing) voltage applied across the dielectric oxide layer of each cell. Accordingly in one embodiment said data processing apparatus further comprises cell reading circuitry configured to apply a non-stress voltage across said dielectric oxide layer of each cell of said plurality of cells to read said randomized value. In other words, the randomized value representing which of the plurality of cells experience the oxide breakdown event is held by the data processing apparatus and can be later read and re-read by a suitable (lower) voltage. The ability to do this means that the data processing apparatus can, when required (typically at one-off initialization stage) generate a randomized value which, although previously unpredictable, can later be reliably read and reread.

This previously unpredictable, randomized value could find a number of applications, such as in security or encryption contexts and accordingly in one embodiment said data processing apparatus is configured to provide said randomized value as a unique identifier for said data processing apparatus.

Whilst in some embodiments the oxide breakdown circuitry is configured to monitor the response of said dielectric oxide layer to said stress voltage whilst the stress voltage is still being applied, in other embodiments said oxide breakdown detection circuitry is configured to measure said response of said dielectric oxide layer to said stress voltage after said stress voltage circuitry has removed said stress voltage from said dielectric oxide layer of said cell.

The plurality of cells could be provided in a number of ways, but in one embodiment said plurality of cells is arranged in an array, wherein said array comprises row and column selection circuitry configured such that an individual cell can be accessed.

This individual cell access could be provided in a number of ways, but in one embodiment each column of said array has an associated bit line, wherein in each column the cells in that column are selectively coupled to the associated bit line; and wherein each row of said array has an associated word line, wherein assertion of a word line signal of the associated word line selects the cells in that row such that those cells are connected to their respective bit lines.

In one embodiment each cell comprises: a device with said dielectric oxide layer; a thick-oxide switch configured to selectively isolate said device with said dielectric oxide layer; and a word line switch configured to selectively connect said device to its respective bit line when a corresponding word line signal is asserted. The provision of a thick-oxide switch protects the word line switch from the high voltage applied to the device with the dielectric oxide layer when it is being stressed.

It will be recognised that the cell could take a number of forms, but in one embodiment said cell comprises a thin oxide capacitor. Further, in one embodiment said thin oxide capacitor comprises a thin-oxide SVT transistor having a source-drain coupling.

As mentioned above the breakdown of the dielectric oxide layer in response to the application of the stress voltage is an essentially uni-directional process (the moderate amount of self-healing also mentioned above notwithstanding). Accordingly said oxide breakdown process may comprise an irreversible change in the resistance of said dielectric oxide layer. Viewed another way, said oxide breakdown process may comprise a non-transient change in the resistance of said dielectric oxide layer. Viewed yet another way, said oxide breakdown process may comprise a non-transient change in the physical structure of said dielectric oxide layer.

Viewed from a second aspect, the present invention provides a method of generating a randomized value in a data processing apparatus comprising a cell comprising a dielectric oxide layer, the method comprising the steps of: applying a stress voltage across said dielectric oxide layer of said cell to cause an oxide breakdown process to occur; determining a current extent of said oxide breakdown process by measuring a response of said dielectric oxide layer to said stress voltage; and determining a randomized value in dependence on said current extent of said oxide breakdown process.

Viewed from a third aspect, the present invention provides a data processing apparatus comprising: a cell comprising a dielectric oxide layer; stress voltage means for applying a stress voltage across said dielectric oxide layer of said cell to cause an oxide breakdown process to occur; oxide breakdown detection means for determining a current extent of said oxide breakdown process by measuring a response of said dielectric oxide layer to said stress voltage; and randomized value determination means for determining a randomized value in dependence on said current extent of said oxide breakdown process.

BRIEF DESCRIPTION OF THE DRAWINGS

The present invention will be described further, by way of example only, with reference to embodiments thereof as illustrated in the accompanying drawings, in which:

FIG. 10 (in two parts) illustrates various characteristics of an implementation of one embodiment.

DESCRIPTION OF THE PREFERRED EMBODIMENTS

Figure 1A:
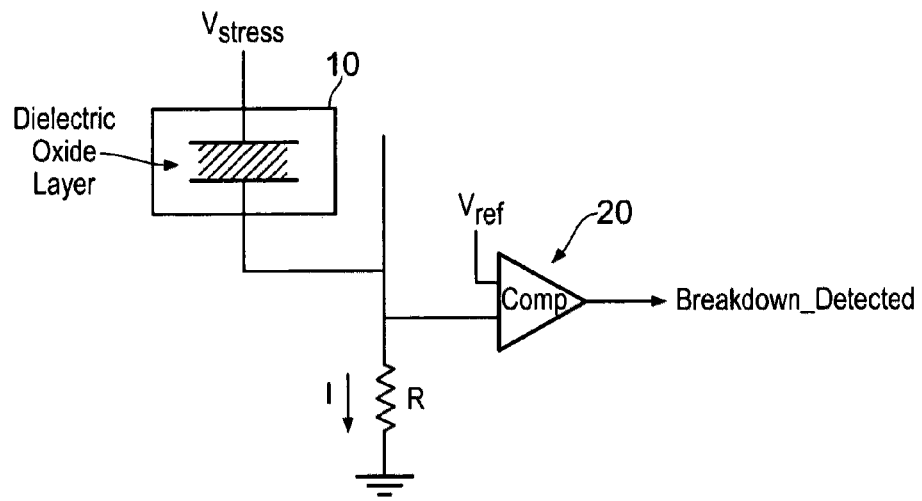
FIG. 1A schematically illustrates the application of a stress voltage to a dielectric oxide layer and the circuitry configured for the detection of an oxide breakdown event in the dielectric oxide layer.
Figure 1B:
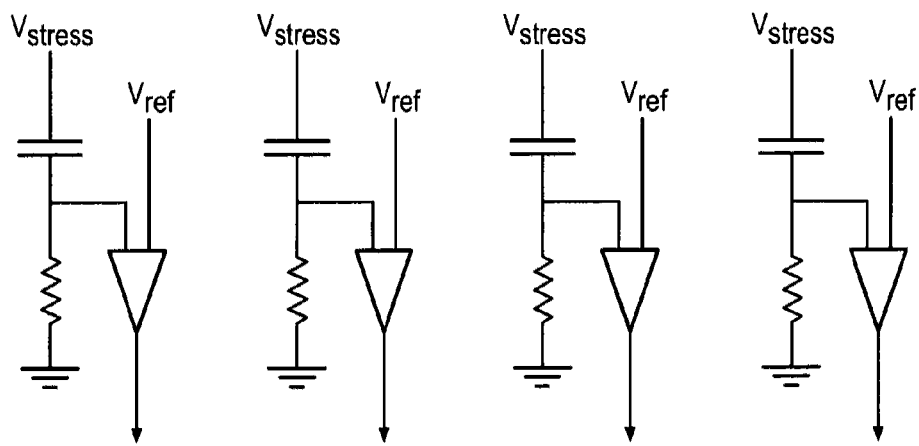
FIG. 1B schematically illustrates an array of dielectric oxide layer devices in which an oxide breakdown event can be detected.

FIG. 1A schematically illustrates a simple arrangement in which a cell 10 comprises a capacitor having a dielectric oxide layer. A stress voltage $V_{STRESS}$ is applied to the cell 10 to seek to induce an oxide breakdown process in the dielectric oxide layer. A comparator 20 is provided to measure the response of the dielectric oxide layer to the stress voltage, in particular by measuring the voltage across a (nominal) resistor R connected to ground. Initially, the resistance of the dielectric oxide layer is high and the measured voltage does not exceed the reference voltage $V_{REF}$ used by the comparator. However, after a while, the application of the stress voltage to the dielectric oxide layer causes the dielectric oxide to begin to break down and the dielectric oxide becomes more conductive. This causes the voltage drop across the cell 10 to decrease and the voltage measured by the comparator 20 to increase. When the voltage measured by the comparator 20 exceeds $V_{REF}$ then the output signal of the comparator changes state, indicating that the oxide breakdown event has occurred. As will be discussed in more detail in the following, the occurrence of an oxide breakdown event in a single cell can be made use of, or (as shown in FIG. 1B) a number of such cells may be provided (of which only four are shown here for clarity) and the outputs of the respective comparators can be used simultaneously.

Figure 2A:
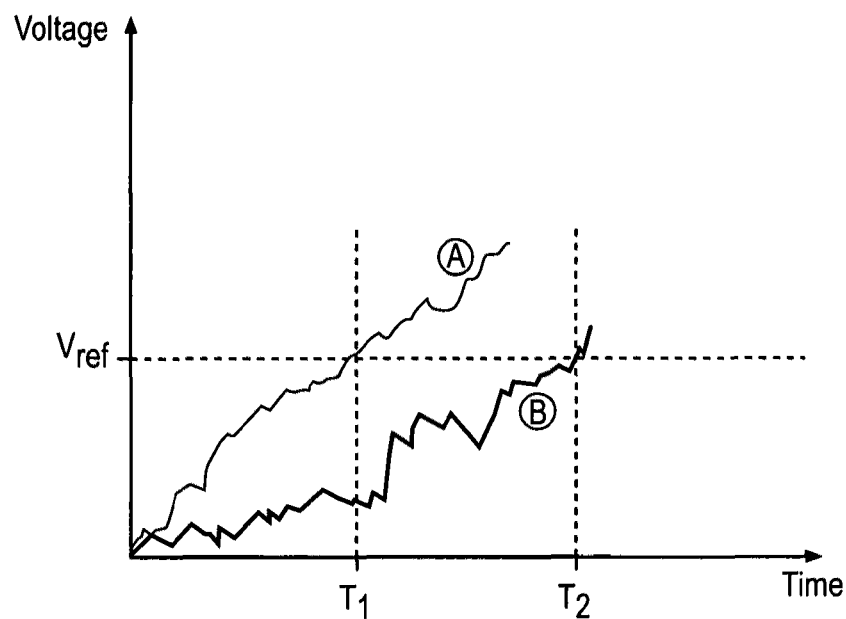
FIG. 2A illustrates example dielectric oxide breakdown progressions for two different dielectric oxide layers in terms of a voltage measurement.
Figure 2B:
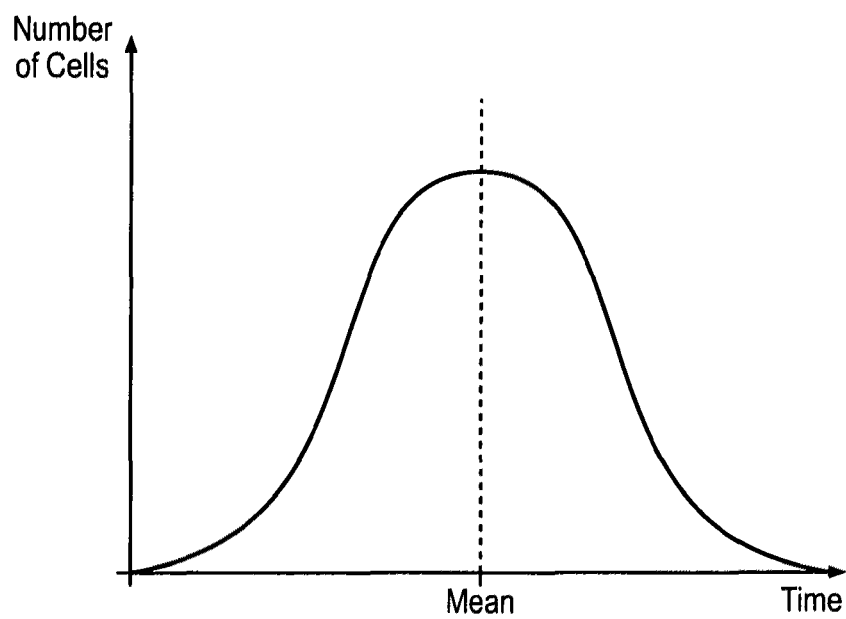
FIG. 2B illustrates a normal distribution of the times to dielectric breakdown for a large sample of dielectric oxide layers.

FIG. 2A illustrates how the dielectric oxide breakdown process differs for two different dielectric oxide layers A and B subjected to a stress voltage. Furthermore it can be seen that for either dielectric oxide layer, the progression of the dielectric breakdown is not smooth, but follows an erratic evolution. Nevertheless, the overall trend in the same in that both layers A and B, subjected to the stress voltage, exhibit an increasing conductivity, allowing the voltage measured by the comparator (see FIG. 1A) to at some point exceed the comparator's reference voltage $V_{REF}$. This occurrence is referred to herein as an oxide breakdown event. The precise timing of when ($T_1$ and $T_2$ respectively for A and B) this happens is unpredictable and the following described embodiments make use of the unpredictability as the random source for generating randomized values. Generally, if a large sample of dielectric oxide layers are subjected to a stress voltage, the times that the layers take for their conductivity to rise sufficiently for $V_{REF}$ to be reached will follow a normal distribution with finite variance as shown in FIG. 2B.

Different embodiments of the invention make use of this distribution in different ways, as will be described in more detail in the following. In one embodiment a single cell is stressed at a time and the unpredictability of when that particular cell (for this particular stress iteration) will develop sufficient conductivity for $V_{REF}$ to be reached is exploited to generate a randomized bitstream of values. In another embodiment an array of cells are stressed at the same time and the unpredictability of which particular cells will experience the oxide breakdown event is exploited to generate a randomized value. These embodiments are now described.

Figure 3:
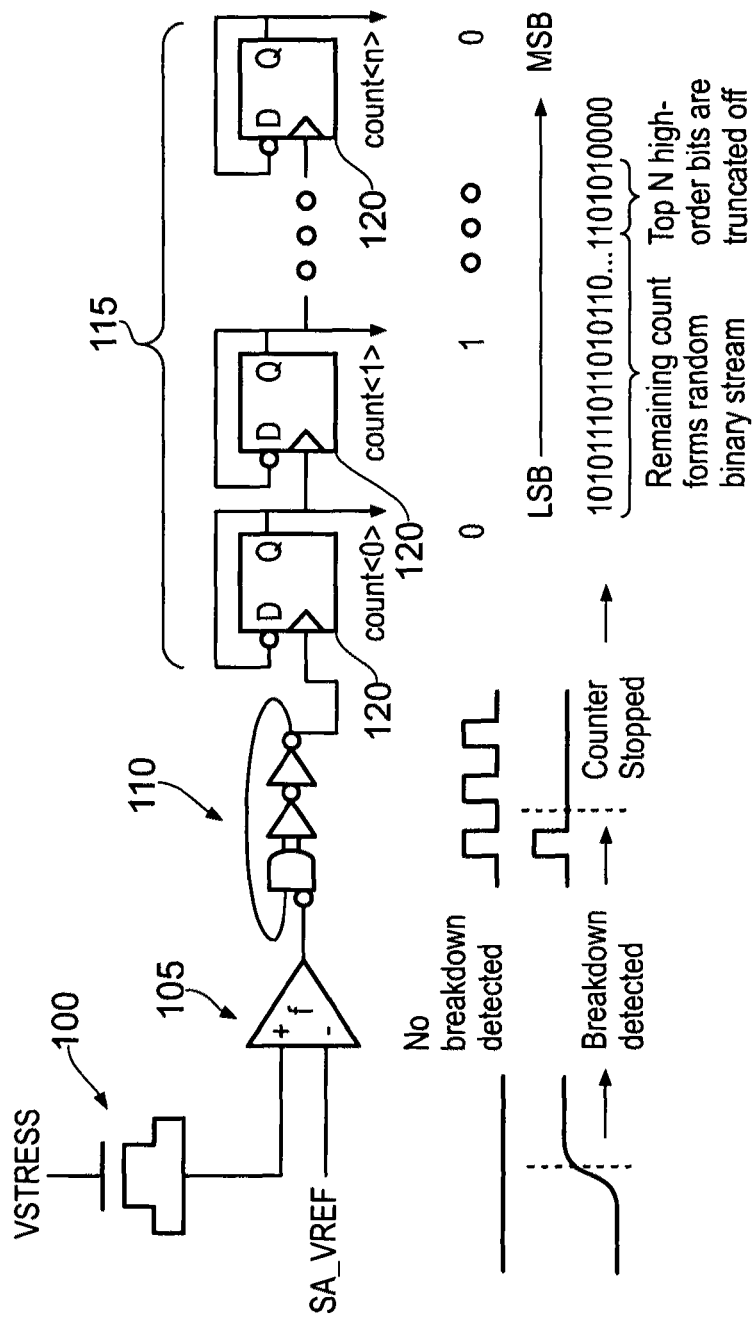
FIG. 3 schematically illustrates the arrangement and operation of one embodiment, in which the time between applying a stress voltage and an oxide breakdown event being detected is used to generate a random bitstream.

FIG. 3 schematically illustrates a data processing apparatus in a first embodiment in which a cell comprising a dielectric oxide layer is used to generate a random binary stream. In this example, the dielectric oxide layer is within a thin-oxide SVT transistor 100 with its source and drain tied together to form a moscap. A sense amplifier 105 provides the comparator which compares the output voltage of the transistor 100 to the reference voltage SA_VREF. Note that the nominal resistance connecting the transistor 100 to ground is not shown for clarity of illustration.

A pulse generator 110 is enabled at the same time that the stress voltage is applied to transistor 100 and the resulting pulsed signal is counted by bit counter 115, which in this example is embodied by concatenated flops 120. Accordingly, the bit counter runs from the time the stress voltage is applied to the transistor 100, until the point at which the output voltage of the transistor 100 exceeds SA_VREF causing the pulse generation, and hence the counter, to stop.

Since, as discussed above with reference to FIG. 2B, the time to dielectric breakdown (TTB) follows a normal distribution with a finite variance, the counter value generated will correspondingly follow a normal distribution with finite variance, assuming that the counter is of sufficient size. In many digital processing systems this is less desirable than a generated random bit stream having a uniform distribution of bits. As illustrated in FIG. 3, the provided arrangement resolves this by truncating the counter value, discarding higher order bits whilst keeping lower order bits to be output as the random binary stream. Depending on the particular system requirements, a predetermined number N of high order bits are discarded. The lower order bits form a high quality randomized bit stream with an even bit distribution, since these lower order bits are sure to have rolled over in the counter at least $2^{N-1}$ times. Alternatively, if the length of time the counter can represent is small by comparison with the TTB, all bits of the counter will roll over. If this happens a sufficient number of times, the counter value may already have a uniform distribution and such truncation may not be necessary.

Figure 4:
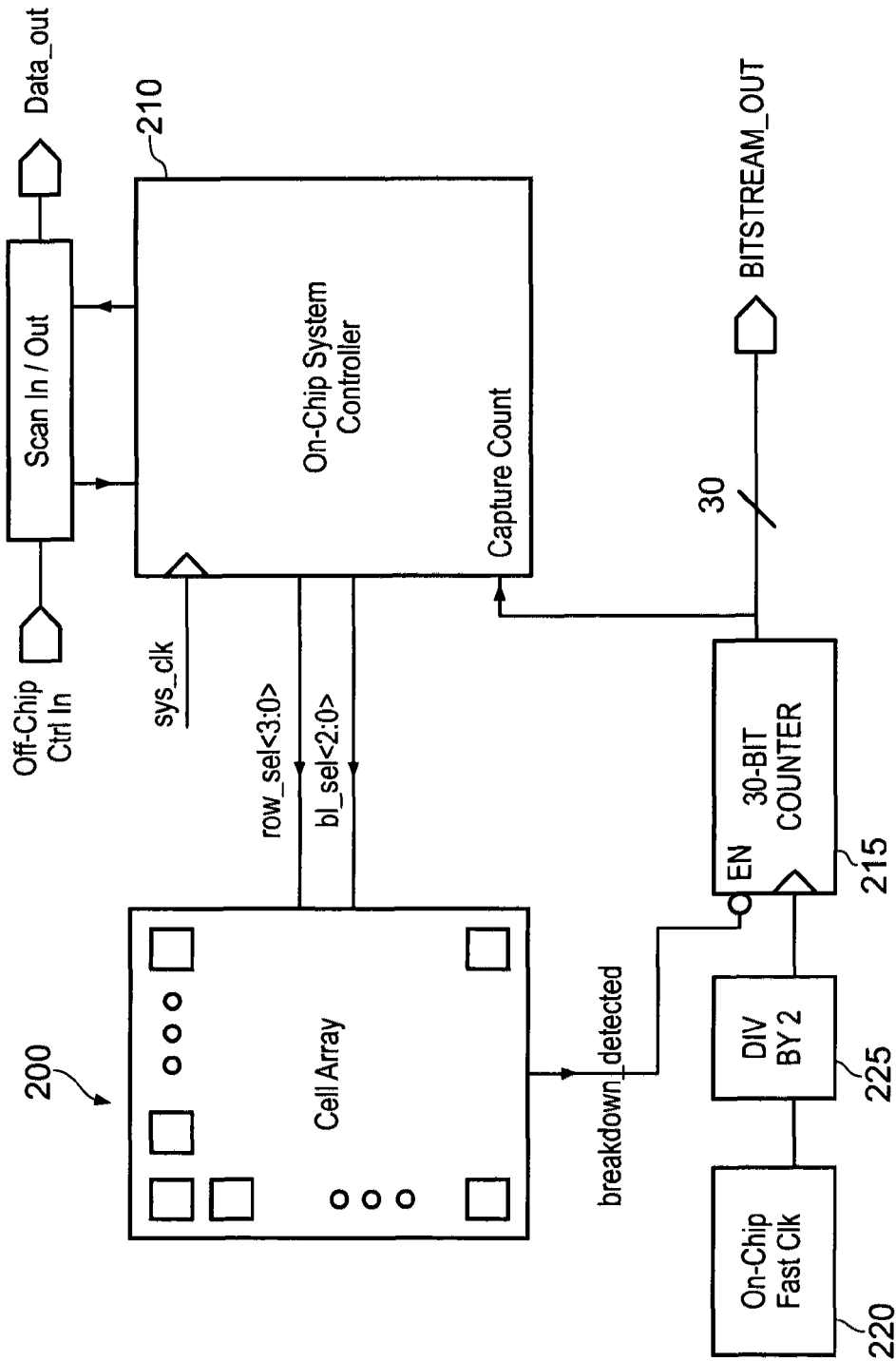
FIG. 4 schematically illustrates an embodiment in which individual cells in a cell array can be selected as the source cell for detection of an oxide breakdown event for the purpose of generating a random bitstream.

FIG. 4 schematically illustrates a system level view of an arrangement in which a cell array 200 is provided from which an individual cell can be selected by an on-chip system controller 210 for generating the randomized bit stream in dependence on when oxide breakdown for that selected cell occurs. An individual cell within the cell array 200 is selected by means of the row selection signal row_sel and the column selection signal bl_sel. The signal row_sel is a 4-bit value corresponding to the 16 rows of cells and bl_cell is a 3-bit value corresponding to the 8 columns of cells. The "breakdown_detected" signal generated by the selected cell is used to stop the 30-bit counter 215, which is started when the stress voltage is applied to the selected cell. In this example the pulse signal to be counted is derived from the on-chip fast clock 220 via divide-by-2 unit 225.

Figure 5:
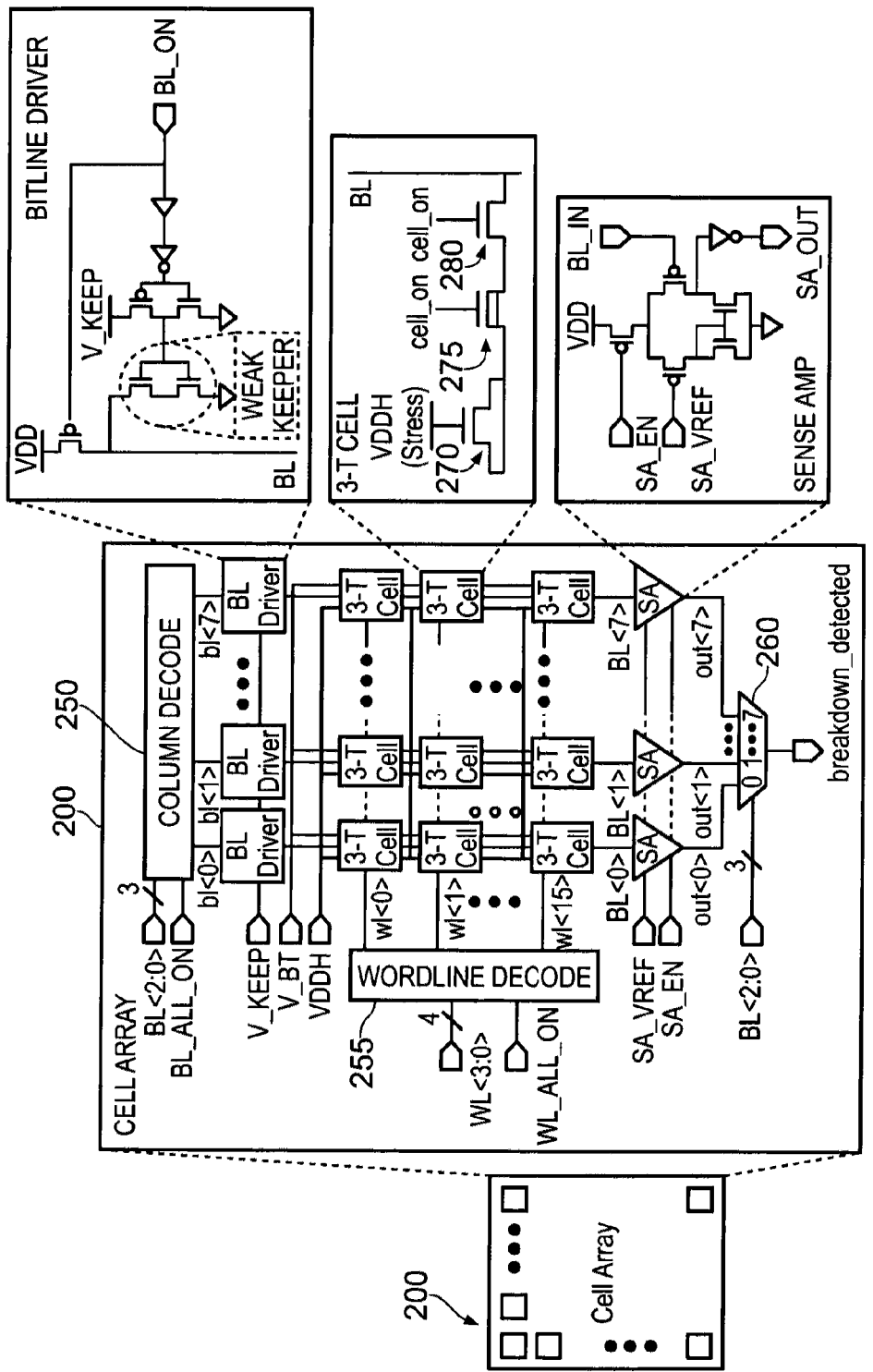
FIG. 5 illustrates in more detail the configuration of the cell array shown in FIG. 4 in one embodiment.

FIG. 5 schematically illustrates in more detail the internal configuration of the cell array 200 shown in FIG. 4. It can be seen that the cell array 200 comprises 128 cells (in 8 columns and 16 rows). The cell array further comprises column decode circuitry 250 and word line decode circuitry 255. Thus, by asserting the relevant bit line and word line signals, the system controller can select a particular cell to be stressed. The output voltage of the bit line connected to that selected cell is monitored by the relevant sense amplifier SA. The bit line signal also steers the final multiplexer 260 to provide the "breakdown_detected" signal.

Each cell in this embodiment is in fact a 3-T cell comprising three transistors. The transistor to be stressed 270 is a thin-oxide SVT transistor with its source tied to its drain to form a moscap. This is connected to a thick-oxide "blocking" transistor 275, which is itself further connected to a thin-oxide SVT transistor 280 driven by the word line. The word line transistor 280 connects the cell to the relevant bit line BL. In this embodiment the thick-oxide transistor 275 is switched in parallel to the thin-oxide word line device 280 (by the relevant word line signal—generically labelled cell on in FIG. 5).

Figure 6:
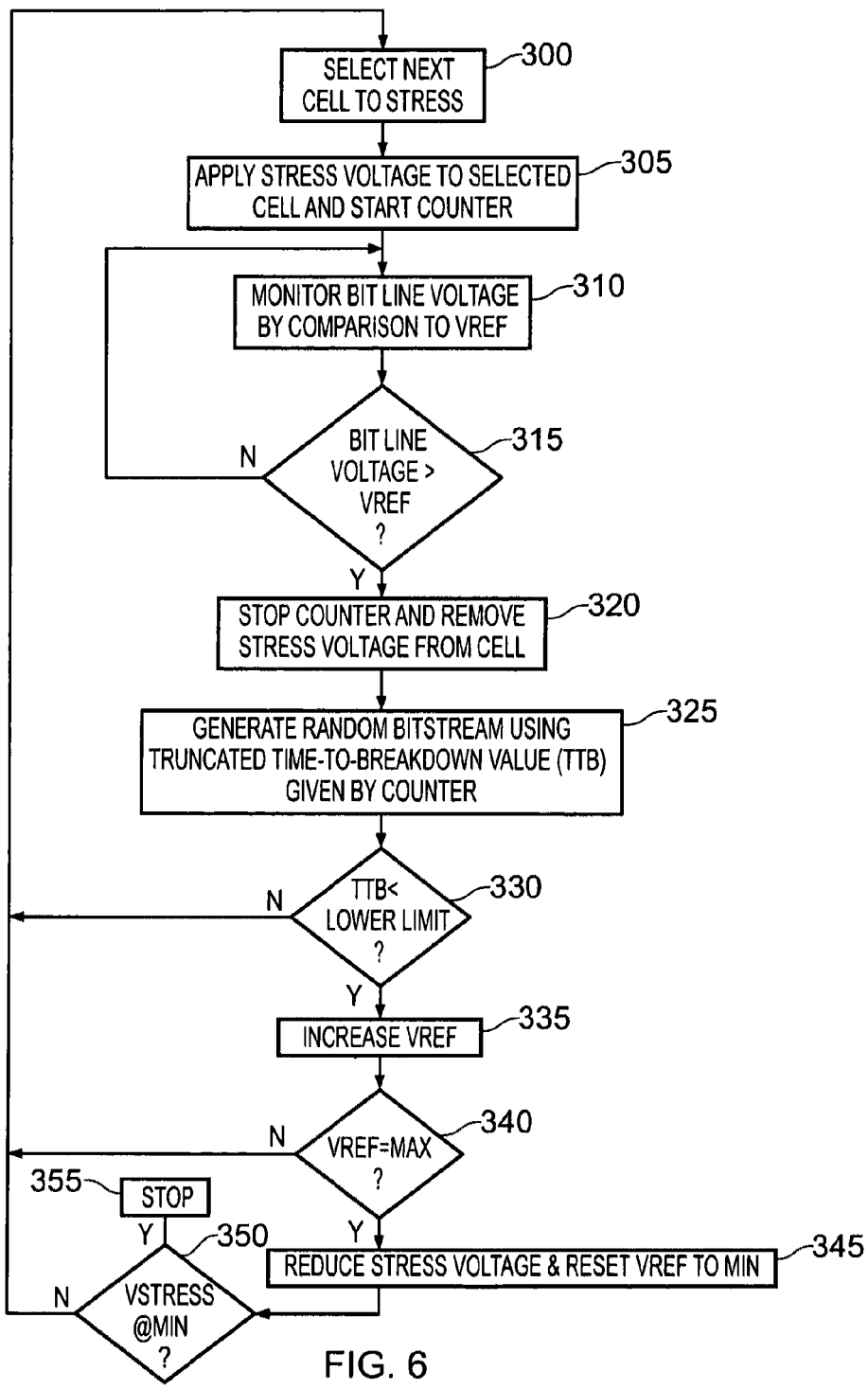
FIG. 6 schematically illustrates a series of steps taken in generating a random bit stream according to one embodiment.

FIG. 6 schematically illustrates a series of steps taken in an embodiment such as that described above with reference to FIGS. 3-5, in which a random bit stream is generated. Firstly, the next cell to stress is selected at step 300 and at step 305 the stress voltage is applied to that selected cell and the binary counter is started. At step 310 the bit line voltage is monitored by comparison to the reference voltage $V_{REF}$. It is thereby continuously monitored if the bit line voltage yet exceeds the reference voltage $V_{REF}$ (step 315). Until it does, the monitoring of steps 310 and 315 continues.

Once the bit line voltage is determined to have exceeded $V_{REF}$, then at step 320 the counter is stopped and the stress voltage is removed from the cell. At step 325 the random bit stream is generated using the truncated time-to breakdown (TTB) value given by the counter. As described above this truncation is performed by removing a predetermined number of high order bits.

It is also determined (step 330) if the TTB value given by the counter has become too short in that it is below a lower limit. If it is not, then the flow returns to step 300 for stressing the next cell in the array. If however the TTB value is found to be too low then at step 335 the reference voltage $V_{REF}$ is increased. At step 340 it is determined if $V_{REF}$ has reached its maximum value, and if it hasn't then the flow returns to step 300 for the next cell to be stressed. If however at step 340 $V_{REF}$ has reached its maximum then the flow proceeds to step 345, where the stress voltage is reduced and the reference voltage $V_{REF}$ is reset to a minimum value. Finally, at step 350 it is determined if the stress voltage has reached a predetermined minimum value. If it has not, the flow proceed via step 300 again, but if it has then it is determined that the stress voltage cannot be further lowered and the flow stops at 355.

An example system based on that illustrated in FIGS. 2, 3 and 4 having 128 cells has been fabricated for testing purposes in a 65 nm CMOS integrated circuit, consuming 0.0012 $mm^2$ of area and using 2 mW of power. This system generated 11 kb/s of random data under test. The system clock frequency was 650 MHz (halved to 325 MHz for the counted signal) and VDD was 1.1V. In this implemented 65 nm integrated circuit, arranged to stress each cell in turn in a round-robin fashion, each gate oxide is capable of generating around 10-20 million bits. Accordingly the total number of bits that can be generated on-chip is greater than 1 billion. Considering this in the context of an example cryptographic application, which needs a randomly generated session key of 128 bits (e.g. in a SSL transaction), it can, be seen that a typical gate oxide in this implementation can generate 78,125 symmetric keys. As a consequence, the lifetime of the cell array as a source of randomly generated 128 bit value will typically easily surpass the lifetime of the device in which it is embedded. Of course the number of bits generated can easily be adjusted by changing the number of gate oxides.

Figure 7:
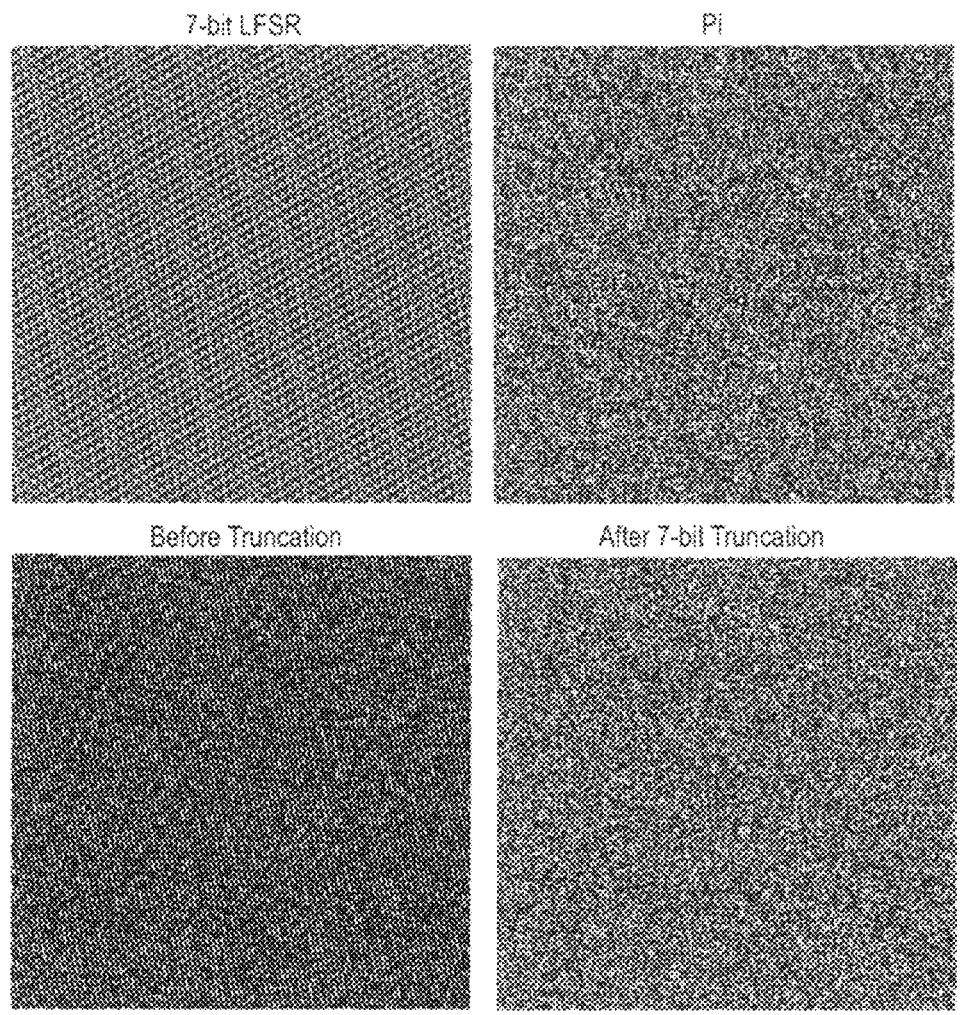
FIG. 7 provides a graphical illustration of the randomization quality of four different algorithms.

FIG. 7 shows a comparison of pseudorandom binary sequences generated from a 7-bit linear feedback shift register (LFSR), digits of π, and values from the above-described implementation before and after truncation. Black pixels indicate zeros whilst white pixels indicate ones. Bits have been placed consecutively from top to bottom, then left to right in each image. It can clearly been seen that the LFSR and pre-truncation sequences demonstrate visible patterns, whilst the digits of π and the implementation sequence after truncation show no such patterns and (at least visually) appear fully random. The bit stream generated by this implementation was also tested against the NIST 800-22 test suite. The truncated sequence (i.e. with higher order bits removed) passed all fifteen of the NIST tests with statistical significance. Note that no post-processing was required to achieve this. This performance exceeds that of the prior art random number generators mentioned in the introduction.

Figure 8A:
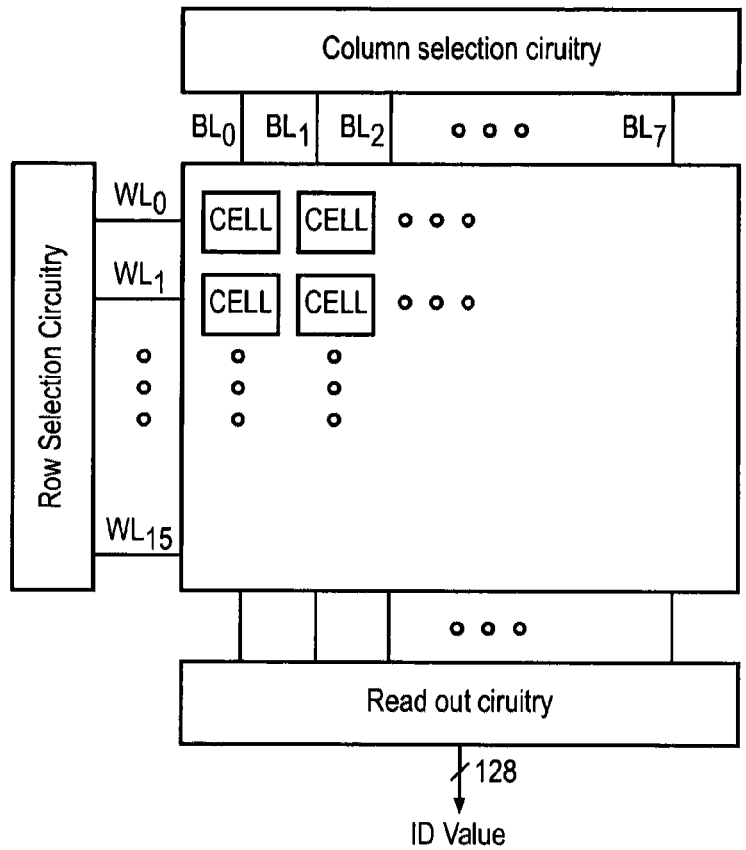
FIG. 8A schematically illustrates an array of cells and its associated selection and readout circuitry which can generate a unique apparatus ID in one embodiment.
Figure 8B:
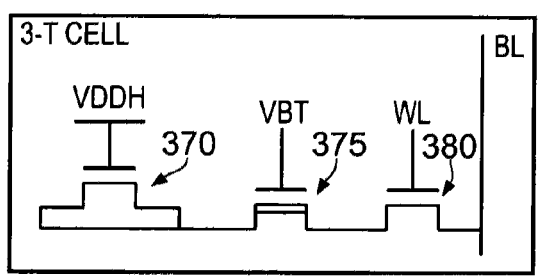
FIG. 8B schematically illustrates the configuration of a cell in the FIG. 8A embodiment.

FIGS. 8A and 8B schematically illustrates a second embodiment wherein the array of cells are simultaneously stressed by exposure to a stress voltage for an identical stress time. At the conclusion of the stress time (but not during, as in the first embodiment) the cells are read out using a sense amplifier reference value for the comparators which enables determination of which cells have undergone an oxide breakdown event. It should be noted that the stress voltage applied to each cell in this embodiment can be more "aggressive" than in the previous embodiment, since the aim here is to intentionally cause a significant degree of oxide breakdown is some of the cells, such that a distinction can later readily be made between those cells that have undergone this oxide breakdown event and those that haven't. By contrast in the first embodiment described above, it is preferable to apply a more modest stress voltage, which is sufficient to cause oxide breakdown on the required timescale, but does not cause more damage to the oxide layers than is necessary, so that each cell can be reused many times for random number generation.

In FIG. 8A the access circuitry (column and row selection) are essentially the same as the embodiments described in FIGS. 4 and 5, and this description is not repeated here for brevity. The essential difference between the first embodiment and this embodiment is the above mentioned approach to setting the stress voltage and furthermore the fact that in the first embodiment only one cell is read out at a time, whereas in this embodiment, all cells are read out simultaneously to provide a 128-bit value. This 128-bit value is used as an unique ID for the device which contains this apparatus. This unique ID can for example be used to enforce a user licence, or as part of a security protocol.

FIG. 8B illustrates a difference in the configuration of the cells in the array shown in FIG. 8A to those shown in FIG. 5 with respect to the first embodiment. Each cell is again a 3-T cell comprising three transistors. The transistor to be stressed 370 is again a thin-oxide SVT transistor with its source tied to its drain as a moscap. This is connected to a thick-oxide "blocking" transistor 375, which is controlled by the VBT signal to isolate the thin-oxide word line device 380 from the high voltage of the moscap 270 during stress. The thin-oxide word line device 380 is controlled by the relevant wordline signal WL to connect the moscap 370 to the bitline during a read process which takes place after the stress period. The stress period is in fact an iterative series of stress intervals, at the conclusion of each the reading takes place, such that it can be monitored when approximately half the cells have undergone an oxide breakdown event. This iterative process is described below.

Figure 9:
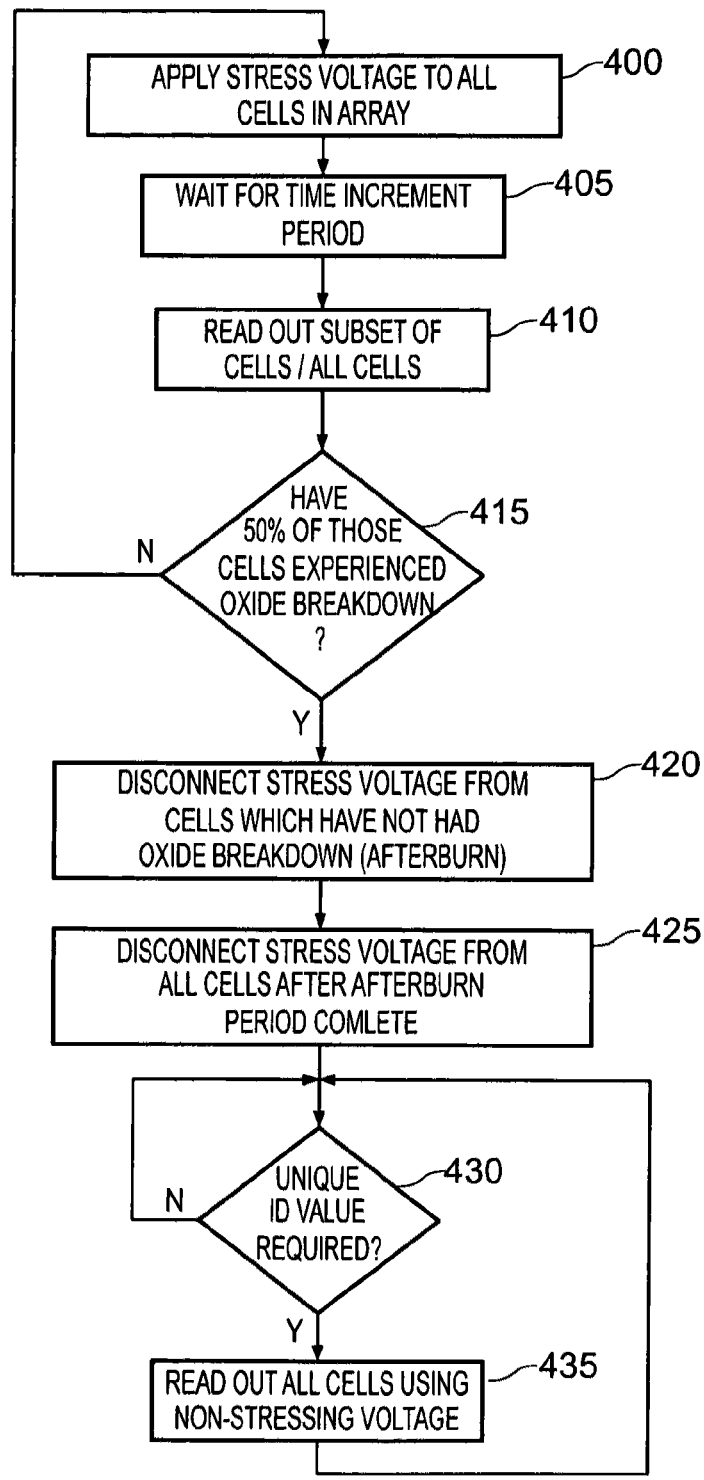
FIG. 9 schematically illustrates a series of steps taken in generating a unique ID in one embodiment.

FIG. 9 schematically illustrates a series of steps taken in the second embodiment in which all cells in the array are simultaneously stressed to generate a unique ID for the apparatus. The flow begins at step 400 where the stress voltage is applied to all the cells in the array. The stress voltage is applied for a predetermined time increment period (step 405) and then (with the stress voltage removed) at step 410 the cells are read out. In one variant (the "global" algorithm) all cells are read out. In an alternative variant, only a subset of the cells are read out (the "canary" algorithm). Then a step 415 it is determined if more than half of those cells which have been read out have experienced oxide breakdown. If they have not, then the flow return to step 400 where the stress voltage is reapplied to all cells in the array.

However, once the 50 percent mark has been reached, then at step 420 the stress voltage is disconnected from those cells which have not experienced an oxide breakdown event. In other words, the stress voltage is reapplied for a further period for those cells which have had oxide breakdown. This "afterburn" process is particularly directed to those cells which have only just passed the criteria for oxide breakdown (i.e. the relevant comparators have only just indicated that the readout voltage has exceeded the reference voltage). The afterburn process seeks to further stress these borderline cases such that when some later self-healing of the stressed oxide layers occurs, these cells do not return to a state in which they will be read as not having undergone an oxide breakdown event.

Then at step 425 the stress voltage is disconnected from all cells. The unique ID generation process is complete at this point and the final two steps illustrated in FIG. 8 show how the unique ID value thus generated can be read out. Accordingly, the flow waits at step 430 until the unique ID value is required. At step 435 all cells are read out using a non-stressing voltage, i.e. one which is sufficient to allow a determination to be made of which cells have previously under gone an oxide breakdown event, but which is not sufficiently high to cause further oxide breakdown. The flow then returns to the step 430 loop until the next time that the unique ID value is required to be read out.

The following Appendix provides further description of a particular example of the second embodiment with reference to FIG. 10.

APPENDIX-OxID: ON-CHIP ONE-TIME RANDOM ID GENERATION USING OXIDE BREAKDOWN

Abstract

A new chip ID generation method is presented that leverages the random and permanent characteristics of oxide breakdown. A 128 b ID array is implemented in 65 nm CMOS and two algorithms for stressing the oxides are presented, showing a near-ideal Hamming distance of 63.92 in silicon measurements and consistent IDs across voltage and temperature.

Chip ID systems are used to enforce user licenses as well as in communication and security protocols. In these applications, it is desirable to generate IDs on-chip at the application point so IDs are guaranteed unknown until first used. This avoids the need for offchip, pre-generated IDs that are programmed using fuses, a process that exposes IDs to human intervention and storage on computers that may be compromised.

A key requirement for chip ID generation is that the generated ID is unique to only that chip, and that the ID is time and environmentally invariant. The chances that two chip IDs have all, or many, bits the same is minimized by using a large bit width (e.g., 128 bits/ID) and ensuring a high degree of randomness during generation. Previous methods rely on inherent threshold voltage (Vt) mismatch between devices, which is detected by measuring either device current [1] or inherent SRAM bitcell skew towards 0 or 1 states [2]. However, Vt mismatch can be very small between any particular transistor pair, making it difficult to repeatedly generate an identical ID for a given chip. Hence, previous approaches exhibit a small number of bit flips between successive ID readings (i.e., the IDs had a non-zero self Hamming distance), complicating the use and reliability of chip IDs.

A new method is presented called OxID that generates chip IDs using oxide breakdown. We leverage the fact that oxide breakdown is an inherently random effect [3] (one oxide may break long before another identical oxide under the same stress conditions) and is also both abrupt and permanent. Hence, it enables improved ID stability over time and environmental conditions. Once an oxide breaks down, its resistance changes from a nearly infinite value to the order of $M\Omega$ or $k\Omega$ [4], which has made it popular for one-time programmable arrays [5,6]. Silicon measurements of 162 ID generators in this work demonstrate nearly ideal randomness of the generated IDs, maximizing their uniqueness. The proposed approach can also detect prior ID generation; if on first use the ID is non-zero, this indicates that the ID was previously generated through possible intrusion and may be compromised.

Proposed System and ID Generation Method

OxID consists of a memory array composed of 3-T memory cells that use a thin-oxide moscap as a fuse element (FIGS. 10[A] and 10[B]). The array has 16 rows by 8 columns, totalling 128 cells, each of which can be read through a bitline and sense amplifier. All oxides in the array are exposed to a stress voltage of 4.5V and identical stress time. While the breakdown times of the 128 oxides follow a random distribution, the mean of this distribution is difficult to determine a priori and can change from chip to chip due to oxide thickness variations. Hence, exposing all chips to a preset stress time will likely result in a significant portion of OxIDs with oxides either all broken or unbroken. Therefore, we propose two algorithms that dynamically adjust stress time to ensure that close to half of all oxides break while half remain intact. Both algorithms stress the array in small time increments using an on-chip controller. In the first algorithm, the entire array is read out after each stress interval. Initially, the array will read nearly all zeros and gradually contain more ones as oxides start to fail. When ones exceed zeros, the stress iterations are terminated and the ID is complete. By dynamically checking the array state after each stress interval, the algorithm automatically adapts to the global condition of the oxides, providing added stress to more inherently reliable arrays. It also provides immunity to voltage fluctuations during the stressing.

One drawback of this approach is that all generated IDs will have a nearly identical number of zeros and ones. While this does not reduce the randomness of the IDs, it does reduce the number of possible ID permutations. For a 128 b ID, the number of possible ID permutations reduces by a factor of $\sim 2^{3.8}$. Hence, if an equivalent pool of IDs is required as in a standard random ID, the number of bits must be increased (e.g., for a 128 b ID, by 4 bits or ~3%). Therefore, we propose a second algorithm that uses a small set of canary cells to predict the number of stress iterations for the entire array. In this case, only cells specified as canary cells are read out after each stress interval and further array stress is terminated when 50% of the canary cells are broken. Due to random variation between the canary cells and the remainder of the array, a larger set of ID permutations is generated.

Both algorithms are implemented and compared. After the ID is generated using either algorithm, a final "afterburn" phase is performed where all broken oxides are strongly stressed for a longer duration. Due to limitations of stress isolation a few borderline oxides may break down as well. Hence, this process sacrifices a small Hamming distance degradation (measured at 2-3%) for higher read operation robustness across environmental conditions.

The 3-T bitcell (FIG. 10[C]) consists of a thin-oxide SVT transistor driven by the wordline, a thick-oxide 2.5V I/O "blocking" transistor, and a thin-oxide SVT transistor with S/D tied as a moscap. This bitcell is similar to the 3-T cell in [4,7]. The thick-oxide transistor separates the thin-oxide wordline device from the high voltage of the moscap during stress. For unbroken oxides there is by design a small voltage that accumulates across the moscap due to its high leakage at high VDD (0.7V for VDDH of 4.5V). This protects oxides that have not been selected for stress. Cell currents are limited by the resistance of the minimum-sized thick-oxide transistor and word-access transistor. During cell read, VDDH is shorted to VDD. For experimentation, the 128 oxides can be stressed all at once or by row, column, or cell.

Measurement Results

OxID was implemented in a standard 65 nm CMOS technology. For experimentation, the gate voltage for the blocking transistor (VBT) and the sense amplifier reference voltage were brought in from off-chip, but can also be generated on-chip. We applied the global stress algorithm described above at room temperature to 162 arrays and the canary-based algorithm to 144 arrays. Two perfectly random IDs should, on average, have a Hamming distance of exactly half the total number of bits in the ID. Comparing all pairs of ID bit sequences (13041 and 10296 pairs, respectively), the average Hamming distance for the global algorithm is 63.92, close to the ideal value of 64 (FIG. 10[D]). The average Hamming distance for the canary algorithm is 61.79, implying a trade-off in randomness and ID set size (FIG. 10[E]). The read power is 0.34 pJ per bit (Table 1). The self-Hamming distance upon repeated reading of the ID in different environmental conditions was tested for 14 arrays. Results show 0 self-Hamming distance for up to 100 mV supply voltage deviation from 1.1V nominal and across temperature from 0°C. to 85°C. FIGS. 10[G] and 10[H] show the self-Hamming distance as a function of voltage and sense amplifier read margin across temperature. FIG. 10[I] shows the generated bits for each cell location, averaged across all arrays, with no obvious spatial artefacts. The spatial distribution of the breakdown time of each oxide in a typical array is shown in FIG. 10[F]. Table 1 provides a comparison of OxID to related prior work [1,2], showing improved energy, stability, and density. FIG. 10[J] shows the number of stress intervals across all arrays. FIG. 10[K] shows the chip microphotograph and chip statistics are included in Table 2.

REFERENCES

[1] K. Lofstrom, et al., ISSCC, pp. 372-373, 2000.
[2] Y. Su, J. Holleman, B. Otis, ISSCC, pp. 406-407, 2007.
[3] J. Stathis, J. of Applied Physics, pp. 5757-5766, Vol. 86, November 1999.
[4] J. Kim, and K. Lee, Electron Device Letters, pp. 589-591, September 2003.
[5] P. Candelier et al., IRPS, pp. 169-173, 2000.
[6] H. Ito, and T. Namekawa, CICC, pp. 469-472, 2004.
[7] H-K Cha et al., JSSC, pp. 2115-2124, Vol. 41, No. 9, September 2006.

Although particular embodiments of the invention have been described herein, it will be apparent that the invention is not limited thereto, and that many modifications and additions may be made within the scope of the invention. For example, various combinations of the features of the following dependent could be made with the features of the independent claims without departing from the scope of the present invention.

We claim:

1. The data processing apparatus comprising:
a cell comprising a dielectric oxide layer;
stress voltage circuitry configured to apply a stress voltage across said dielectric oxide layer of said cell to cause an oxide breakdown process to occur;
oxide breakdown detection circuitry configured to determine a current extent of said oxide breakdown process by measuring a response of said dielectric oxide layer to said stress voltage; and
randomized value determination circuitry configured to determine a randomized value in dependence on said current extent of said oxide breakdown process, wherein said randomized value determination circuitry is configured to determine said randomized value in dependence on a time period measurement of a time period between application of said stress voltage and determination by said oxide breakdown detection circuitry of occurrence of an oxide breakdown event, said oxide breakdown event corresponding to a predetermined extent of said oxide breakdown process.

2. The data processing apparatus as claimed in claim 1, wherein said randomized value determination circuitry is configured to determine said randomized value in dependence on a transformed version of said time period measurement.

3. The data processing apparatus as claimed in claim 2, wherein said randomized value determination circuitry is configured to determine said randomized value in dependence on lower order elements of said time period measurement and to discard at least one higher order element of said time period measurement.

4. The data processing apparatus as claimed in claim 3, wherein said randomized value determination circuitry comprises a bit counter configured to generate a bit count value indicative of said time period measurement; and wherein said randomized value determination circuitry is configured to discard a predetermined number of most significant bits of said bit count value and to use remaining lower significance bits as said randomized value.

5. The data processing apparatus as claimed in claim 1, wherein said stress voltage circuitry is configured to remove said stress voltage from said dielectric oxide layer when said oxide breakdown event occurs, such that further progress of said oxide breakdown process on said dielectric oxide layer is halted.

6. The data processing apparatus as claimed in claim 1, wherein said oxide breakdown detection circuitry comprises a comparator configured to compare an oxide layer voltage measured at an output of said cell to a reference voltage.

7. The data processing apparatus as claimed in claim 6, configured such that, if said time period measurement is determined to be below a lower time limit, said oxide breakdown detection circuitry increases said reference voltage.

8. The data processing apparatus as claimed in claim 7, configured such that, if said reference voltage reaches a predetermined reference voltage limit, said stress voltage circuitry decreases said stress voltage and said oxide breakdown detection circuitry resets said reference voltage to a minimum reference voltage.

9. The data processing apparatus as claimed in claim 1, comprising a plurality of cells, each cell of said plurality of cells comprising said dielectric oxide layer, wherein said stress voltage circuitry is configured iteratively to apply said stress voltage across said dielectric oxide layer of each cell of said plurality of cells in turn until said oxide breakdown event occurs in each.

10. The data processing apparatus as claimed in claim 9, wherein said randomized value determination circuitry is configured to concatenate randomized values from said plurality of cells to produce a random bitstream.

11. The data processing apparatus as claimed in claim 1, comprising a plurality of cells, each cell of said plurality of cells comprising said dielectric oxide layer,
wherein said stress voltage circuitry is configured to apply said stress voltage across said dielectric oxide layer of each cell of said plurality of cells simultaneously for a stress period;
said oxide breakdown detection circuitry is configured to determine, for each cell, if an oxide breakdown event has occurred, said oxide breakdown event corresponding to a predetermined extent of said oxide breakdown process; and
said randomized value represents which of said plurality of cells have experienced said oxide breakdown event during said stress period.

12. The data processing apparatus as claimed in claim 11, wherein said randomized value determination circuitry is configured to generate said randomized value as a binary sequence, each bit of said binary sequence being determined by whether said oxide breakdown event has occurred for a corresponding cell of said plurality of cells.

13. The data processing apparatus as claimed in claim 11, wherein said stress voltage circuitry is configured to apply said stress voltage in time increments; and
said randomized value determination circuitry is configured to determine a set of cells which have experienced said oxide breakdown event after each time increment.

14. The data processing apparatus as claimed in claim 13, wherein said stress voltage circuitry is configured to cease said time increments when at least a predetermined proportion of said plurality of cells have experienced said oxide breakdown event.

15. The data processing apparatus as claimed in claim 14, wherein said predetermined proportion is half of said plurality of cells.

16. The data processing apparatus as claimed in claim 13, wherein said randomized value determination circuitry is configured to determine said set of cells from amongst a reduced set of cells in said plurality of cells.

17. The data processing apparatus as claimed in claim 11, wherein said stress voltage circuitry is configured to reapply said stress voltage for a predetermined additional period after said stress period to those cells which have experienced said oxide breakdown event.

18. The data processing apparatus as claimed in claim 11, wherein said data processing apparatus further comprises cell reading circuitry configured to apply a non-stress voltage across said dielectric oxide layer of each cell of said plurality of cells to read said randomized value.

19. The data processing apparatus as claimed in claim 18, wherein said data processing apparatus is configured to provide said randomized value as a unique identifier for said data processing apparatus.

20. The data processing apparatus as claimed in claim 11, wherein said oxide breakdown detection circuitry is configured to measure said response of said dielectric oxide layer to said stress voltage after said stress voltage circuitry has removed said stress voltage from said dielectric oxide layer of said cell.

21. The data processing apparatus as claimed in claim 20, wherein said plurality of cells is arranged in an array,
wherein said array comprises row and column selection circuitry configured such that an individual cell can be accessed.

22. The data processing apparatus as claimed in claim 21, wherein each column of said array has an associated bit line, wherein in each column the cells in that column are selectively coupled to the associated bit line; and
wherein each row of said array has an associated word line, wherein assertion of a word line signal of the associated word line selects the cells in that row such that those cells are connected to their respective bit lines.

23. The data processing apparatus as claimed in claim 22, wherein each cell comprises:
a device with said dielectric oxide layer;
a thick-oxide switch configured to selectively isolate said device with said dielectric oxide layer; and
a word line switch configured to selectively connect said device to its respective bit line when a corresponding word line signal is asserted.

24. The data processing apparatus as claimed in claim 1, wherein said cell comprises a thin oxide capacitor.

25. The data processing apparatus as claimed in claim 24, wherein said thin oxide capacitor comprises a thin-oxide SVT transistor having a source-drain coupling.

26. The data processing apparatus as claimed in claim 1, wherein said oxide breakdown process comprises an irreversible change in the resistance of said dielectric oxide layer.

27. The data processing apparatus as claimed in claim 1, wherein said oxide breakdown process comprises a non-transient change in the resistance of said dielectric oxide layer.

28. The data processing apparatus as claimed in claim 1, wherein said oxide breakdown process comprises a non-transient change in the physical structure of said dielectric oxide layer.

29. A method of generating a randomized value in a data processing apparatus comprising a cell comprising a dielectric oxide layer, the method comprising the steps of:
applying a stress voltage across said dielectric oxide layer of said cell to cause an oxide breakdown process to occur;
determining a current extent of said oxide breakdown process by measuring a response of said dielectric oxide layer to said stress voltage; and
determining a randomized value in dependence on said current extent of said oxide breakdown process, wherein said step of determining a randomized value is dependent on a time period measurement of a time period between application of said stress voltage and determination in said determining a current extent step the occurrence of an oxide breakdown event, said oxide breakdown event corresponding to a predetermined extent of said oxide breakdown process.

30. A data processing apparatus comprising:
a cell comprising a dielectric oxide layer;
stress voltage means for applying a stress voltage across said dielectric oxide layer of said cell to cause an oxide breakdown process to occur;
oxide breakdown detection means for determining a current extent of said oxide breakdown process by measuring a response of said dielectric oxide layer to said stress voltage; and
randomized value determination means for determining a randomized value in dependence on said current extent of said oxide breakdown process, wherein said randomized value determination means determines said randomized value in dependence on a time period measurement of a time period between application of said stress voltage and determination by said oxide breakdown detection means of an oxide breakdown event, said oxide breakdown event corresponding to a predetermined extent of said oxide breakdown process.

\* \* \* \* \*